June 25, 1935.   H. C. SCHLACK   2,005,829
SQUARE SHEAR GAUGE
Filed Jan. 2, 1934   2 Sheets-Sheet 2
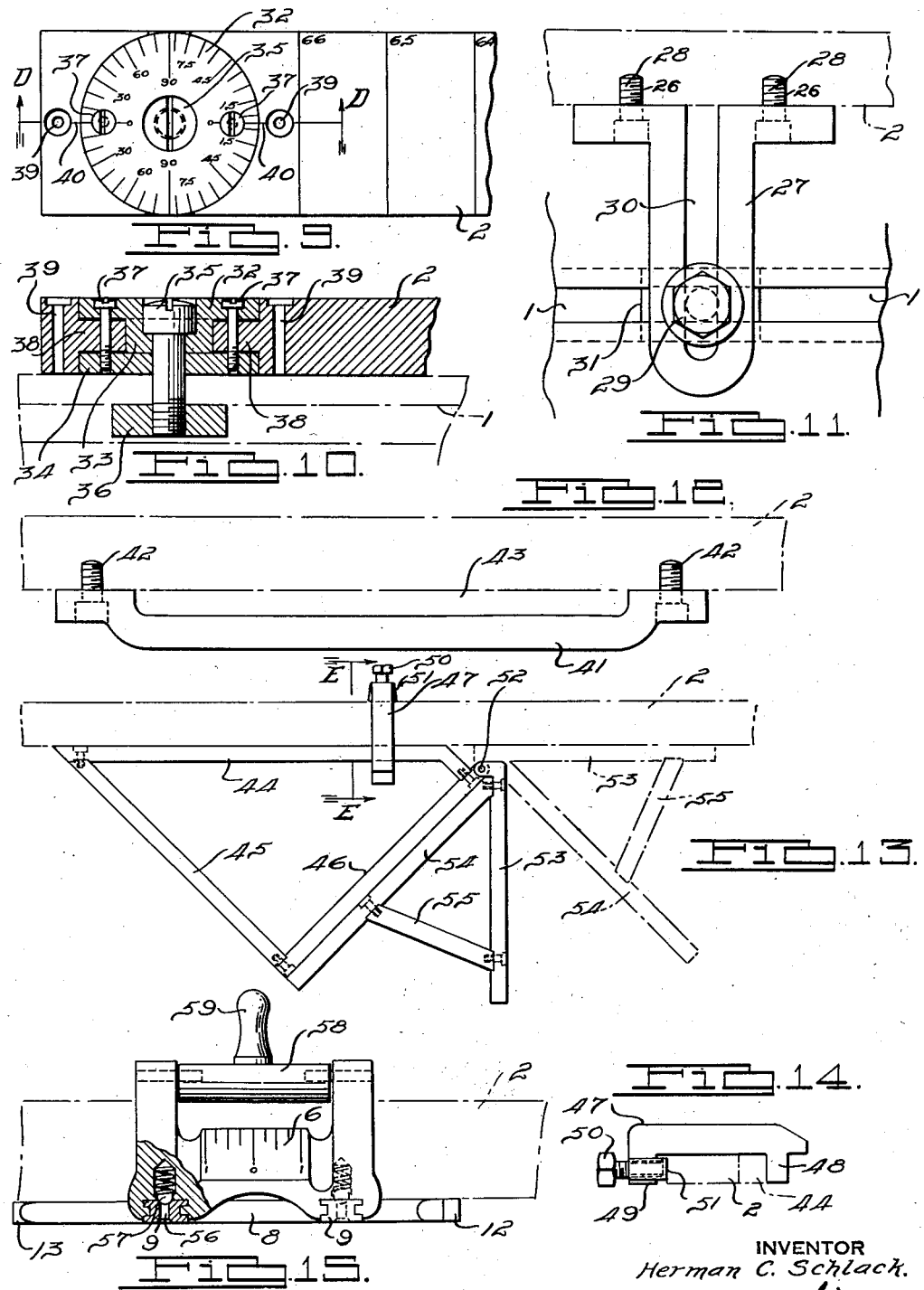
INVENTOR
Herman C. Schlack.
BY
ATTORNEY Patented June 25, 1935

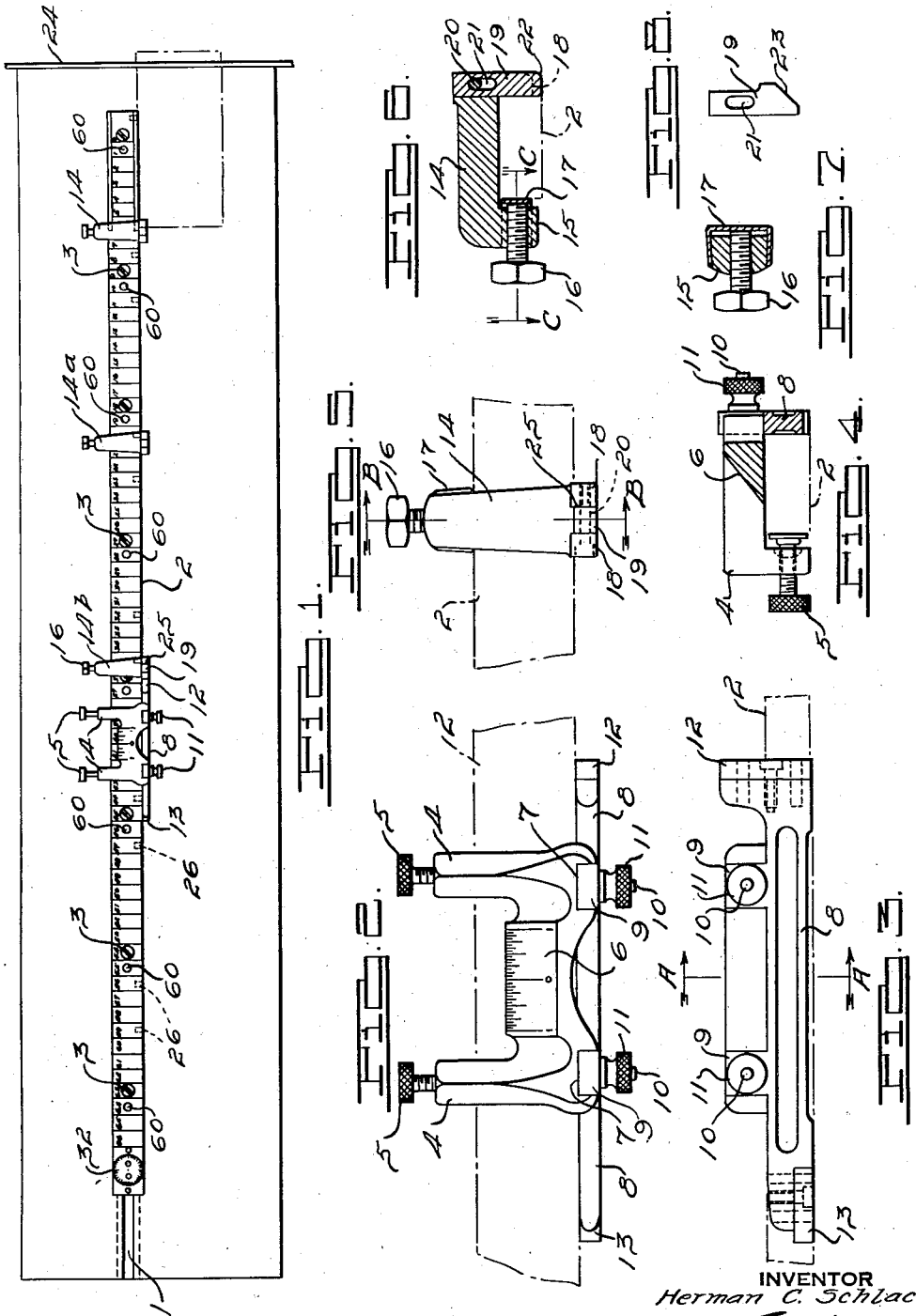

2,005,829

UNITED STATES PATENT OFFICE 2,005,829

SQUARE SHEAR GAUGE

Herman C. Schlack, Detroit, Mich., assignor of forty-nine one-hundredths to Chester A. Kurrash, Detroit, Mich.

Application January 2, 1934, Serial No. 704,841

4 Claims. (Cl. 164—59)

This invention relates to square shear gauges and the object of the invention is to provide a gauge for gauging sheet metal during shearing with the assurance that an exact measurement will be obtained.

Another object of the invention is to provide a square shear gauge which may be mounted on the bed of a standard square shear and which is provided with dogs which may be set to give exact measurements for a sheet being sheared.

Another object of the invention is to provide a means for accurately setting the dogs on the gauge, said means being also adaptable for use in measuring metal sheets.

A further object of the invention is to provide a square shear gauge which can be arranged for cutting angles in sheet metal work.

Another object of the invention is to provide attachments for the gauge whereby the gauge may be set in angular position on the bed of the square shear and whereby metal sheets may be set in angular relation to the square shear gauge.

Another object of the invention is to provide a dog for use on the gauge arranged to allow the metal sheets to move under the dog or to engage against the movable part of the dog for measuring.

These objects and the several novel features of the invention are hereinafter more fully described and claimed and the preferred form of construction by which these objects are attained is shown in the accompanying drawings in which Fig. 1 is a plan view of a square shear gauge embodying my invention.

Fig. 2 is an enlarged view of the device for setting the dogs.

Fig. 3 is a front elevation of Fig. 2.

Fig. 4 is a section taken on line A—A of Fig. 3

Fig. 5 is a plan view of one of the dogs utilized with the gauge.

Fig. 6 is a section taken on line B—B of Fig. 5.

Fig. 7 is a section taken on line C—C of Fig. 6.

Fig. 8 is an elevation of an alternative form of movable piece for the dog.

Fig. 9 is a plan view of the end of the gauge containing the protractor.

Fig. 10 is a section taken on line D—D of Fig. 9.

Fig. 11 is a plan view of a bracket for spacing the gauge on the square shear bed.

Fig. 12 is a plan view of another bracket for use in mounting the gauge in angular position on the square shear bed.

Fig. 13 is a plan view of an angular bracket for use with a square shear gauge.

Fig. 14 is a view taken on line E—E of Fig. 13.

Fig. 15 is a plan view of an alternative form of device for setting the dogs.

The device is adapted for use with any standard type of square shear in which the bed of the square shear is provided with T shaped grooves 1 to which the square shear gauge may be fastened. The square shear gauge comprises a bar 2 which is calibrated in inches and this bar 2 is fastened to the square shear by means of screws 3 which extend into the T shaped groove 1 in the square shear bed and are attached to the usual types of slides mounted in this type of groove which construction is well known and is not here shown. By this arrangement the bar 2 may be secured in place on the square shear bed. The square shear bed is considerably larger than shown in Fig. 1 and is usually provided with a series of T shaped grooves 1 though I have illustrated a narrow bed with a single groove to save space.

The device for setting the dogs is shown in Figs. 2, 3 and 4 and comprises a substantially U shaped bracket having ends 4 which carry adjusting screws 5 shown in Figs. 2 and 4 and the central portion of the bracket is provided with an angular face 6 having calibrations reading one inch each side of zero. The lower edge of the bracket is provided with notches 7 and a member 8 is provided having two lugs 9 adapted to fit in the notches 7 and each lug is apertured to receive the stud 10 which extends through each lug 9 and each stud is provided with a knurled nut 11 by which the member 8 may be secured to the bracket. The member 8 at one end is provided with a vertical hardened piece 12 secured thereto and at the opposite end is provided with a horizontal hardened piece 13 secured thereto as shown in Fig. 3. This setting device may be positioned over the bar 2 as shown in Fig. 4 with the member 8 engaging one side of the bar and the set screws 5 engaging the opposite side thereof to secure the bracket in place on the bar. A series of dogs 14 may be provided, one of which is illustrated in Fig. 5. This dog 14 at one end, as shown in Fig. 6, is provided with a depending portion 15 carrying a set screw 16 and this set screw engages against a U shaped bracket 17 which is shown more particularly in Fig. 7. This bracket 17 is formed from sheet metal and the upturned ends thereof ride in shallow ways provided in the end 15 of the dog. These ways extend at a slight angle and the member 17 is movable a slight distance in either direction longitudinally of the screw 16. At the same time the member 17 will not come off from the dog and therefore cannot be lost. The object of the member 17 is to prevent the end of the screw 16 from marring the measuring bar 2 when clamped thereon. The opposite end of the dog 14 is provided with two depending ends 18 having a space therebetween in which the slidable member 19 may be positioned.

A pin or screw 20 connects the two depending ends 18 and the member 19 is provided with an elongated slot 21 through which the pin 20 extend. By this arrangement, the member 19 is slidably mounted in the end of the dog and due to the slot 21 normally drops to a position to rest on the square shear bed below the lower edge of the depending ends 18 of the dog as will be understood from Fig. 6. This member 19 is also provided with a rounded edge 22 so that in moving a sheet of metal toward the scale bar 2 the sheet may engage under this rounded edge and move the member 19 upwardly on the pin 20 to allow the metal sheet to be brought to contact with the edge of the scale bar. An alternative form of the member 19 is shown in Fig. 8 in which an angling face 23 may be provided so that fairly thick metal plates may be moved against this face 23 and will raise the member 19. The sides of the member 19 are flat so that a metal sheet may be slid under the lower edge of the depending end 18 and into engagement with the side of the member 19, as will be understood from Fig. 1, so that the sheet may be accurately positioned in relation to the scale bar.

In use the scale bar 2 is first positioned over the slot 1 and the setting devise 4 is moved down to the zero mark at the right end of the scale bar 2. The knurled nuts 11 are then removed from the studs 10 and the member 8 is withdrawn from these studs as will be understood from Fig. 3 and is turned end for end to bring the hardened piece 13 to the right of the bracket shown in Fig. 3. At this time the lugs 9 are engaged over the studs 10 and the knurled nuts 11 are replaced. The set screws 5 are then turned up with the zero on the setting device 4 registering with the zero on the scale bar 2.

The scale bar is then adjusted in position with the setting device thereon so that the hardened end 13 contacts the face of the shear blade 24 shown in Fig. 1. The screws 3 are then tightened to firmly secure the scale bar 2 in place on the square shear bed. At this time the setting device 4 may be moved longitudinally of the scale bar to any desired adjustment and a metal sheet may be laid on the bed of the square shear with one edge of the sheet against the scale bar and one corner engaging the hardened piece 13 of the setting device. At this time the sheet may be sheared with the shear 24 and will be accurate as to size along its upper edge.

However, for cutting different sides of the sheet, dogs 14 are preferably used as shown in Figs. 1 and 5. For this purpose the member 8 is secured to the setting device as shown in Figs. 1, 2 and 3. When assembled in this manner, the setting device is moved to the desired measurement and the dog is positioned over the scale and is moved up so that one of the depending ends 18 engages the hardened piece 12 of the setting device 4. By then turning up the set screw 16 with a wrench, the dog may be firmly fixed in position on the scale bar. The difference in distance between the zero mark on the setting device 4 and the end of the hardened piece 13 and the zero mark on the setting device 4 and the end of the hardened piece 12 is equal to the width of the depending end 18 plus the width of the member 19 so that when the dog is set up against the hardened face 12 the face 25 of the member 19, shown in Fig. 5, is the same distance from the zero marking on the setting device as the end of the hardened piece 13. This insures the face 25 on the member 19 being set an exact distance from the shear blade 24 as indicated by the calibrations on the setting device 4 and on the scale bar.

At this time, a metal sheet may be positioned against the scale bar and against the face 25 of the member 19 and the sheet may be sheared accurately. Assuming the desired measurement to be 24 inches, the dog 14a shown in Fig. 1 will be set in the position shown by means of the setting device. Assuming the other side of the sheet is to be 40 inches, the dog 14b is set by the setting device in the position shown in Fig. 1 and is secured firmly in place by turning up the set screw 16. At this time, the setting device may be removed from the scale bar, if desired, and the long edge of the sheet may be moved up against the lower edge of the scale bar at which time, the member 19 in the dog 14a will be pushed upwardly by the edge of the sheet and the corner of the sheet may be moved against the face 25 of the member 19 in the dog 14b. At this time the sheet may be sheared with the assurance that it will be exactly 40 inches long as the distance between the face 25 in the dog 14b and the shear blade will be exactly 40 inches. In other words, a series of dogs may be positioned on the scale bar and may be utilized in gauging different sides of a sheet or sheets to be sheared. In this connection it will be noted that the calibrations in the setting device 4 may be utilized for setting the dogs at fractional measurements between the inch calibrations shown on the scale bar.

A series of pairs of threaded apertures 26 are provided in the lower edge of the scale bar and a U bracket 27 may be provided as shown in Fig. 11 which may be secured to the scale bar by screws 28 threaded into the threaded apertures 26. A screw 29 shown in Fig. 11 may be threaded through the slot 30 in the U bracket and through the slot 1 in the bed of the square shear and into a shoe 31 positioned in the slot 1, so that by means of the brackets 27 the scale bar may be set away from and parallel to the slot 1 in the bed of the square shear.

This is only utilized where the slot 1 in the square shear bed is not in the desired position and the scale bar is graduated on both sides so that the bar may be turned over to bring the aperture 26 on either side of the scale bar so that the scale bar may be set either side of the slot 1. In reversing the position of the scale bar, apertures 60 are provided in the scale bar so that when the scale bar is turned over the screws 3 are removed and may be inserted through the apertures 60 to the square shear bed in the reversed position. Of course, when the brackets 21 are used, the screws 3 are removed and are replaced by the bolts 29 shown in Fig. 11 which are used to mount the scale bar in place of the screws 3.

The gauge may also be used for cutting angles. For this purpose, as shown in Figs. 1, 9 and 10, a protractor 32 is provided having a reduced central portion 33 fitting in an aperture provided in the end of the scale bar 2. A second part 34 is provided and a screw 35 extends through the parts 32 and 34 and into a shoe 36 provided in the way or slot 1 in the square shear bed. A pair of screws 37 are provided which extend through the protractor and flange 38 of the scale bar and normally lock the protractor in position at the zero reading. To use the protractor, these screws are removed and dropped into the holes 39 provided on each side of the protractor and at this time the scale bar 2 may be swung at any angle as determined by the position of the marks 40 in relation to the periphery of the protractor. In order to secure the scale bar in position on the square shear bed, brackets 41 are provided which extend between the threaded apertures 26 in the scale bar and the bracket 41 spans the space between the inside of the apertures 26 of the adjacent pairs.

This bracket may be secured to the scale bar by the screws 42 and provides a slot 43 between the bracket and scale bar through which screws may be inserted and connected to shoes in the square shear bed slots. In this connection it will be noted that the usual square shear bed is provided with a series of slots similar to the slot 1 so that when the scale bar extends at an angle across the bed the brackets 41 may be positioned on the scale bar to extend across the adjacent slots and provide a means for anchoring the scale bar in position at the desired angle. In this connection it will also be noted that the scale bar is calibrated on both sides and may be reversed to allow the metal sheets to be positioned on the square shear bed on either side of the scale bar. However, when the scale bar is set at an angle, the end of the scale bar must be accurately spaced from the shear blade so that the setting device may be utilized to accurately position the dogs on the scale bar in relation to the shear blade.

In Fig. 13, a device is shown by which a metal sheet may be positioned at various angles in relation to the scale bar. The device comprises a stationary part formed of three portions 44, 45 and 46 which are secured together in the form of a triangle and a dog 47 is provided which is shown more particularly in Fig. 14 and is provided with a depending end 48 which may be engaged over any side of the triangular frame member and the opposite end 49 of the dog may be engaged over the scale bar. The end 49 carries a set screw 50 and a pressure shoe 51 which is similar to the set screw 16 and pressure shoe 17 shown in Fig. 7. This dog 47 is utilized to clamp the triangle to the scale bar and the portion 46 of the triangle is provided with a pivot 52 on which a frame member 53 is pivotally mounted, the said frame member having an inturned end for this purpose.

Connected at one end to the frame member 53 is an angular frame member 54 and a frame member 55 is provided connecting the frame members 53 and 54. When in the position shown in full lines in Fig. 13, the metal sheet may be moved up against the frame member 53 which extends at a right angle to the scale bar. However, the member 53 may also be turned to the position shown in dotted lines in Fig. 13 forming a right angle between the members 46 and 54 so that one corner of a sheet may be positioned in this right angle for angle shearing other portions of the sheet. This device may be utilized when the scale bar extends at a right angle to the shear blade or at other angles thereto.

In Fig. 15, an alternative form of setting device is shown in which the lugs 9 of the member 8 are provided with grooves and the setting bracket is provided with ways fitting these grooves. The ends 9 of the member 8 may be slipped up into the ways of the setting device and each end 9 is provided with an aperture 56 while the setting device is provided with a spring pressed ball 57 engaging in the aperture 56 when the member 8 has been moved to the proper position. By this arrangement the member 8 is retained in proper position in the setting device and may be reversed end for end if desired. This setting device is provided with a cam roller 58 and a handle 59 so that when positioned on the scale bar 2 the handle 59 may be turned to bring the high side of the cam 58 into engagement with the side of the scale bar to grip the scale bar between the eccentric and the member 8. This setting device may be readily removed by turning the handle 59 to bring the high portion of the eccentric away from the scale bar and thus allow removal of the setting device.

From the foregoing description it becomes evident that the device is very simple and efficient in operation, will not easily get out of order, may be used for accurately measuring sheets to be sheared and provides a device which accomplishes the objects described.

Having thus fully described my invention, its utility and mode of operation, what I claim and desire to secure by Letters Patent of the United States is:

1. In a square shear gauge, a bar calibrated in inches, a protractor in one end of the bar adapted for attachment to the bed of a square shear, the bar being turnable on the protractor and being adapted for attachment at an angle to the bed of the square shear, a member adjustable longitudinally of said calibrated bar, said member being provided with calibrations representing subdivisions of inches and registering with the calibrations on the bar, a series of dogs adjustably mounted on the calibrated bar, each dog being provided with a vertically slidable member normally arranged to drop by gravity below one edge of the calibrated bar, each slidable member being provided with a rounded edge so that a metal sheet may be moved therebeneath into contact with the edge of the bar and the calibrated member being adapted for accurately positioning the dogs on the calibrated bar.

2. In a square shear gauge, a bar calibrated in units and adapted for attachment to the bed of a square shear, a member adjustable longitudinally of said calibrated bar, said member being provided with calibrations representing subdivisions of the calibrations on the bar and registering with the calibrations on the bar, a series of dogs adjustably mounted on the calibrated bar, each dog being provided with a slidable member normally arranged to drop by gravity below one edge of the calibrated bar, said slidable member being provided with a rounded edge so that a metal sheet may be moved therebeneath into contact with the edge of the bar and the calibrated member being arranged for accurately positioning the dogs on the calibrated bar.

3. In a square shear gauge, a calibrated bar adapted for attachment to the bed of a square shear, a member adjustable longitudinally of said calibrated bar, said member being provided with calibrations registering with the calibrations on the bar and provided with a pair of notches, a second member provided with lugs arranged for engagement in said notches, means for securing the lugs in the notches, the member being reversible in position in the notches and having hardened end faces and a series of dogs adjustably mounted on the calibrated bar and arranged to be set in accurate position on the bar by means of said calibrated member.

4. In a square shear gauge, a calibrated bar adapted for attachment to the bed of a square shear, a member adjustable longitudinally of said calibrated bar, said member being provided with calibrations registering with the calibrations on the bar and provided with a pair of notches, a second member provided with lugs detachably secured in said notches, said second member having a hardened end face and a series of dogs adjustably mounted on the calibrated bar and arranged to be set in accurate position on the bar by means of said calibrated member.

HERMAN C. SCHLACK.